United States Patent
Nowatari et al.

(10) Patent No.: US 10,333,175 B2
(45) Date of Patent: Jun. 25, 2019

(54) NONAQUEOUS ELECTROLYTE SECONDARY BATTERY

(71) Applicant: SANYO Electric Co., Ltd., Daito-shi, Osaka (JP)

(72) Inventors: Yuko Nowatari, Osaka (JP); Naoya Tsukamoto, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 193 days.

(21) Appl. No.: 15/502,862

(22) PCT Filed: Aug. 27, 2015

(86) PCT No.: PCT/JP2015/004308
§ 371 (c)(1),
(2) Date: Feb. 9, 2017

(87) PCT Pub. No.: WO2016/051656
PCT Pub. Date: Apr. 7, 2016

(65) Prior Publication Data
US 2017/0244133 A1  Aug. 24, 2017

(30) Foreign Application Priority Data
Sep. 30, 2014 (JP) .................... 2014-200322

(51) Int. Cl.
*H01M 10/0587* (2010.01)
*H01M 2/16* (2006.01)
(Continued)

(52) U.S. Cl.
CPC ......... *H01M 10/0587* (2013.01); *H01M 2/16* (2013.01); *H01M 2/166* (2013.01);
(Continued)

(58) Field of Classification Search
CPC .............................................. H01M 10/0587
See application file for complete search history.

(56) References Cited

U.S. PATENT DOCUMENTS 5,508,122 A  4/1996 Narukawa et al.
2002/0164531 A1* 11/2002 Sekino ............... H01M 2/0285
429/331
(Continued)

FOREIGN PATENT DOCUMENTS

CN  102187497 A  9/2011
JP  63-279562 A  11/1988
(Continued)

OTHER PUBLICATIONS

International Search Report dated Dec. 1, 2015, issued in counterpart application No. PCT/JP2015/004308. (2 pages).
(Continued)

*Primary Examiner* — Sarah A. Slifka
*Assistant Examiner* — Brian R Ohara
(74) *Attorney, Agent, or Firm* — Westerman, Hattori, Daniels & Adrian, LLP

(57) ABSTRACT

A nonaqueous electrolyte secondary battery having an electrode group in which a positive electrode plate containing a positive electrode active material and a negative electrode plate containing a negative electrode active material are wound with a separator there between. The positive electrode active material uses a lithium transition metal oxide represented by the formula $Li_aNi_xM_{1-x}O_2$ ($0.9 \le a \le 1.2$, $0.8 \le x < 1$, and M is at least one element of Co, Mn, and Al). The positive electrode plate is provided with a current-collecting tab placed in a position that is 200 mm or more apart from the winding start of the positive electrode plate. The separator has an MD direction tensile strength ($S_{MD}$)-to-TD direction tensile strength ($S_{TD}$) ratio ($S_{MD}/S_{TD}$) of from 0.72 to 1.37 and an MD direction tensile elongation ($E_{MD}$)-to-TD direction tensile elongation ($E_{TD}$) ratio ($E_{MD}/E_{TD}$) of from 0.34 to 1.29.

4 Claims, 1 Drawing Sheet

(51) Int. Cl.
*H01M 4/36* (2006.01)
*H01M 4/38* (2006.01)
*H01M 4/485* (2010.01)
*H01M 4/525* (2010.01)
*H01M 10/0525* (2010.01)
*H01M 4/48* (2010.01)

(52) U.S. Cl.
CPC ......... *H01M 2/1686* (2013.01); *H01M 4/364* (2013.01); *H01M 4/483* (2013.01); *H01M 4/485* (2013.01); *H01M 4/525* (2013.01); *H01M 10/0525* (2013.01); *Y02T 10/7011* (2013.01)

(56) References Cited

U.S. PATENT DOCUMENTS

| | | | |
|---|---|---|---|
| 2005/0221188 A1* | 10/2005 | Takami | H01M 4/131 429/231.95 |
| 2006/0222940 A1* | 10/2006 | Fujikawa | H01M 2/0413 429/176 |
| 2009/0186280 A1* | 7/2009 | Iidani | H01M 2/1653 429/249 |
| 2011/0111276 A1 | 5/2011 | Sato et al. | |
| 2011/0269010 A1 | 11/2011 | Sawaguchi et al. | |
| 2014/0302366 A1* | 10/2014 | Sugita | H01M 10/0587 429/94 |

FOREIGN PATENT DOCUMENTS

| | | |
|---|---|---|
| JP | 7-320770 A | 12/1995 |
| JP | 11-204142 A | 7/1999 |
| JP | 2008-146969 A | 6/2008 |
| JP | 2011-113915 A | 6/2011 |
| JP | 2012-178237 A | 9/2012 |
| WO | 2007/069560 A1 | 6/2007 |
| WO | 2010/134258 A1 | 11/2010 |

OTHER PUBLICATIONS

English Translation of Search Report dated Jul. 24, 2018, issued in counterpart Chinese Application No. 201580051225.2. (2 pages).

* cited by examiner

NONAQUEOUS ELECTROLYTE SECONDARY BATTERY

TECHNICAL FIELD

The present invention relates to a nonaqueous electrolyte secondary battery.

BACKGROUND ART

In recent years, smaller and lighter mobile data terminals such as mobile phones, notebook personal computers, and smartphones have been increasingly used and batteries used as driving power supplies therefor have been required to have higher capacity.

In particular, nonaqueous electrolyte secondary batteries, which are charged and discharged in such a manner that lithium ions move between positive and negative electrodes, have high energy density and high capacity and therefore are widely used as driving power supplies for the above mobile data terminals.

Furthermore, the nonaqueous electrolyte secondary batteries are recently attracting attention as power supplies for power for electric vehicles and the like and applications thereof are expected to be further expanded.

In such applications, the following improvements are required: further improvements in high capacity enabling batteries to be used for a long time, in the reduction of battery cost, and in the safety in the case where force is applied from the outside by dropping or the like.

One of methods for evaluating the safety of nonaqueous electrolyte secondary batteries is an impact test in which a certain impact is applied to a battery from the outside by vertically dropping a predetermined weight on the battery in charge and no occurrence of rupture or ignition is confirmed.

Patent Literature 1 describes a technique for preventing the ignition and rupture of a battery in such a manner that an uncoated portion is provided on the outermost periphery of a negative electrode, a negative electrode current-collecting tab provided on the outermost periphery and the uncoated portion are arranged so as to overlap each other, and the short-circuit current and heat caused by an external impact are thereby effectively diffused.

CITATION LIST

Patent Literature

PTL 1: Japanese Published Unexamined Patent Application No. 2012-178237

SUMMARY OF INVENTION

Technical Problem

However, even in the case where a short-circuit current and heat are diffused by the technique described in Patent Literature 1, the safety of batteries cannot be sufficiently ensured because of the increase of battery capacity. There is the problem of preventing ignition and rupture when an impact is applied to a battery from the outside.

Solution to Problem

In the present invention, in order to solve the above problem, a nonaqueous electrolyte secondary battery includes an electrode group in which a positive electrode plate containing a positive electrode active material and a negative electrode plate containing a negative electrode active material are wound with a separator therebetween. The positive electrode active material uses a lithium transition metal oxide represented by the formula $Li_aNi_xM_{1-x}O_2$ ($0.9 \leq a \leq 1.2$, $0.8 \leq x < 1$, and M is at least one element selected from the group consisting of Co, Mn, and Al). The positive electrode plate is provided with a current-collecting tab placed in a position that is 200 mm or more apart from the winding start of the positive electrode plate. The separator has an MD direction tensile strength ($S_{MD}$)-to-TD direction tensile strength ($S_{TD}$) ratio ($S_{MD}/S_{TD}$) of from 0.72 to 1.37 and an MD direction tensile elongation ($E_{MD}$)-to-TD direction tensile elongation ($E_{TD}$) ratio ($E_{MD}/E_{TD}$) of from 0.34 to 1.29.

The term "MD direction" refers to a "machine direction (length direction)" and the term "TD direction" refers to a "transverse direction (width direction)".

The tensile strength and tensile elongation of the separator are measured by a test method according to JIS K 7127.

Advantageous Effects of Invention

The present invention features a battery configuration in which the occurrence of a short circuit in a battery can be suppressed even if an impact is applied to the battery from the outside.

DESCRIPTION OF EMBODIMENTS

Figure 1:
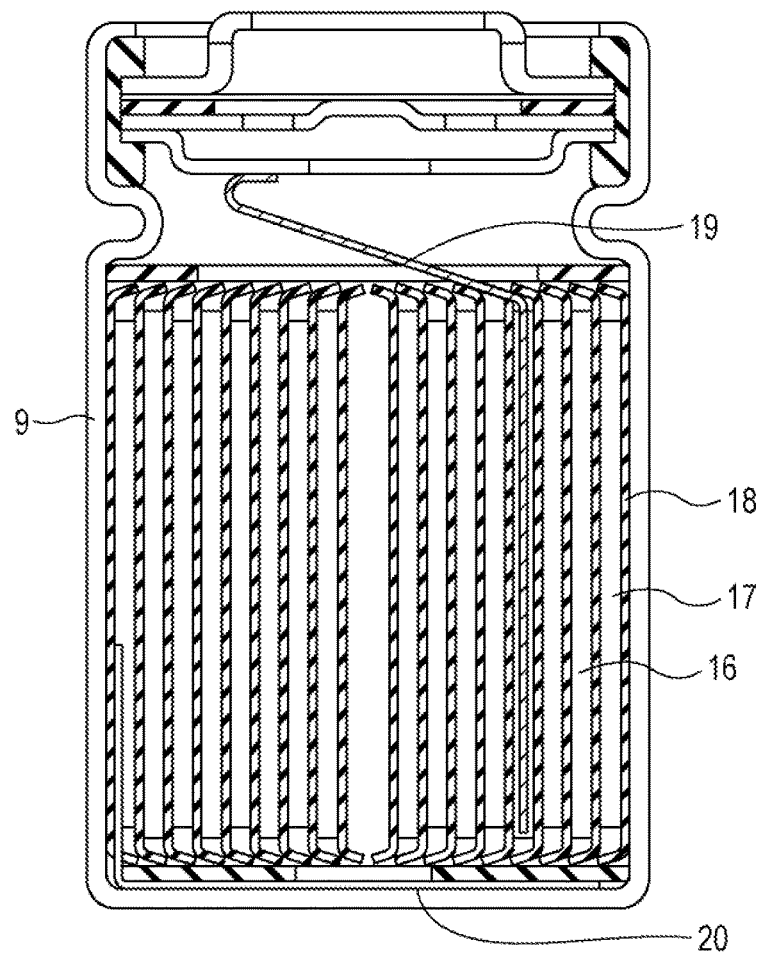
FIG. 1 is a schematic sectional view of a nonaqueous electrolyte secondary battery according to an embodiment of the present invention.

An embodiment of the present invention is described below. This embodiment is an example for carrying out the present invention. The present invention is not limited to this embodiment. Appropriate modifications can be made without departing from the gist of the present invention. Drawings referred to in this embodiment are those schematically illustrated. Dimensions and the like of components depicted in the drawings are different from those of actual components in some cases. The specific dimensional ratio and the like should be determined in consideration of descriptions below.

A nonaqueous electrolyte secondary battery that is an example of this embodiment includes an electrode group in which a positive electrode plate containing a positive electrode active material and a negative electrode plate containing a negative electrode active material are wound with a separator therebetween. In the nonaqueous electrolyte secondary battery, the positive electrode active material uses a lithium transition metal oxide represented by the formula $Li_aNi_xM_{1-x}O_2$ ($0.9 \leq a \leq 1.2$, $0.8 \leq x < 1$, and M is at least one element selected from the group consisting of Co, Mn, and Al), the position of a current-collecting tab placed on the positive electrode plate is 200 mm or more apart from the winding start of the positive electrode plate, and the separator has an MD direction tensile strength ($S_{MD}$)-to-TD direction tensile strength ($S_{TD}$) ratio ($S_{MD}/S_{TD}$) of from 0.72 to 1.37 and an MD direction tensile elongation ($E_{MD}$)-to-TD direction tensile elongation ($E_{TD}$) ratio ($E_{MD}/E_{TD}$) of from 0.34 to 1.29.

The nonaqueous electrolyte secondary battery according to this embodiment has specific separator properties, a positive electrode current-collecting tab position, and the positive electrode active material and therefore is kept insulated by the separator even in the case where an impact is applied to the battery from the outside and the electrode group is deformed; hence, the occurrence of a short circuit in the battery can be suppressed.

This is probably because only when components of the present invention are equipped, even in the case where an impact is applied to the battery, the crush of the electrode group and the rupture of the separator (particularly a site close to the positive electrode current-collecting tab) due thereto are unlikely to occur and the short-circuiting of the battery, the ignition caused by the short-circuiting thereof, and the like are suppressed.

The following structure is cited as an example of the nonaqueous electrolyte secondary battery: a structure in which an electrode group formed by winding a positive electrode plate 16 and a negative electrode plate 17 with a separator 18 therebetween and a nonaqueous electrolyte are housed in an enclosure can 9.

Figure 2:
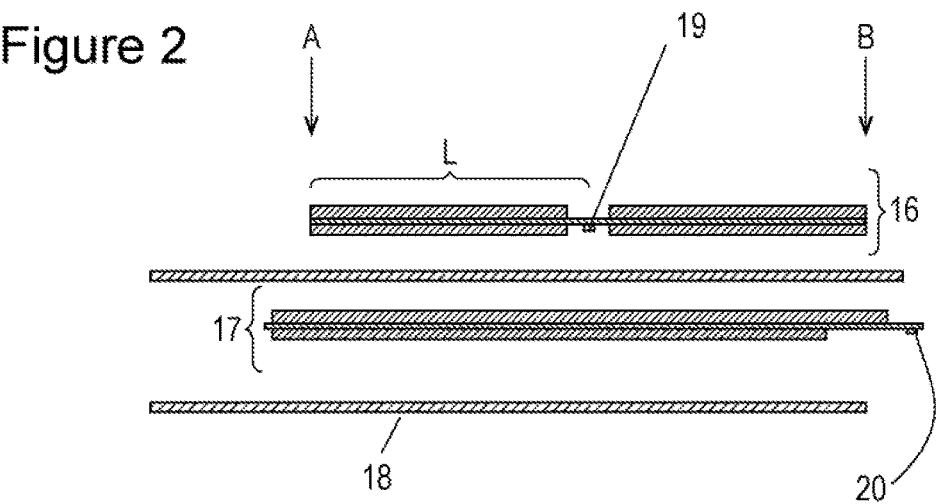
FIG. 2 is a schematic view showing the configuration of a nonaqueous electrolyte secondary battery according to an embodiment of the present invention.

As shown in FIGS. 1 and 2, the electrode group has a structure in which the positive electrode plate 16 equipped with a positive electrode current-collecting tab 19 and the negative electrode plate 17 equipped with a negative electrode current-collecting tab 20 are wound with the separator 18 therebetween. The electrode group and a nonaqueous electrolyte solution serving as the nonaqueous electrolyte are housed in the enclosure can 9 and are hermetically sealed with a sealing member.

As shown in FIG. 2, the distance L from the winding start A of the positive electrode plate to the positive electrode current-collecting tab 19 is the value of a positive electrode tab position specified in the present invention. Herein, the structure of the electrode group or an enclosure is not limited to this. The structure of the electrode group may be an electrode group formed by winding the separator such that the separator entirely covers the outermost periphery of the electrode group.

[Positive Electrode]

The positive electrode plate is composed of a positive electrode current collector and a positive electrode mix layer formed on the positive electrode current collector. For example, a conductive thin film, particularly metal or alloy foil of aluminium or the like that is stable in the potential range of a positive electrode or a film having a metal surface layer of aluminium or the like is used for the positive electrode current collector. The positive electrode mix layer preferably contains a conductive material and a binder in addition to the positive electrode active material.

The positive electrode active material of the present invention is the lithium transition metal oxide, which is represented by the formula $Li_aNi_xM_{1-x}O_2$ (0.9≤a≤1.2, 0.8≤x<1, and M is at least one element selected from the group consisting of Co, Mn, and Al).

In particular, a Ni—Co—Mn-based lithium transition metal oxide has excellent output characteristics and regeneration characteristics and therefore is preferable. A Ni—Co—Al-based lithium transition metal oxide has high capacity and excellent output characteristics and therefore is more preferable.

In a battery using the positive electrode active material of the present invention, when an impact is applied, an electrode group is unlikely to be crushed, a positive electrode current-collecting tab is unlikely to be deformed, and therefore a separator is unlikely to be split. This is probably because particles of the positive electrode active material are hard and a positive electrode plate is hard.

In the case where a micro-short circuit is caused, as the resistance of an electrode plate is higher, the current flowing during short circuiting can be more reduced and heat generation in the battery and ignition due thereto are more unlikely to be caused.

[Negative Electrode]

The negative electrode plate includes a negative electrode current collector and a negative electrode mix layer formed on the negative electrode current collector. For example, a conductive thin film, particularly metal or alloy foil of copper or the like that is stable in the potential range of a negative electrode or a film having a metal surface layer of copper or the like is used for the negative electrode current collector. The negative electrode mix layer preferably contains a thickening agent and a binder in addition to the positive electrode active material. Carboxymethylcellulose (CMC), carboxyalkylcellulose, hydroxyalkylcellulose, alkoxycellulose, or the like is preferably used as the thickening agent. Styrene-butadiene rubber (SBR), polyacrylic acid, polyimide, or the like is preferably used as the binder.

A carbon material capable of intercalating and deintercalating lithium ions or the like is used as the negative electrode active material. The carbon material is preferably particles containing graphite. The negative electrode active material preferably includes a negative electrode active material that is the carbon material and a negative electrode active material that is silicon and/or a silicon compound. The silicon compound is preferably particles of a silicon oxide represented by $SiO_x$ (0.5≤x≤1.5). The silicon compound is more preferably surface-coated with a carbon-containing material.

The carbon coating is preferably composed mainly of amorphous carbon. Using amorphous carbon enables a good, uniform coating to be formed on the surface of the silicon compound and enables the diffusion of lithium ions in the silicon compound to be promoted.

The mass ratio of the carbon material to the silicon compound is preferably 99:1 to 70:30 and more preferably 97:3 to 90:10.

This is because in the case where a micro-short circuit that the resistance of powder is high is caused, as the resistance of an electrode plate is higher, the current flowing during short circuiting can be more reduced and heat generation in the battery and ignition due thereto are more unlikely to be caused. From such a viewpoint, for the negative electrode plate, $SiO_x$ that the resistance of powder is high is preferably contained in an electrode. On the other hand, when the content of the silicon compound is more than 30% by mass, reductions in output characteristics due to a reduction in discharge voltage and the like are caused. Therefore, the content of the silicon compound is preferably 30% or less.

[Nonaqueous Electrolyte]

The nonaqueous electrolyte contains a nonaqueous solvent and an electrolyte salt dissolved in the nonaqueous solvent. The nonaqueous electrolyte is not limited to a liquid electrolyte (nonaqueous electrolyte solution) and may be a solid electrolyte using a gel-like polymer or the like.

For example, a linear carbonate or a cyclic carbonate is used as the nonaqueous electrolyte. Diethyl carbonate (DEC), methyl ethyl carbonate (MEC), dimethyl carbonate (DMC), and the like are cited as the linear carbonate. Propylene carbonate (PC), ethylene carbonate (EC), fluoroethylene carbonate (FEC), vinylene carbonate (VC), and the like are cited as the cyclic carbonate. In particular, a solvent mixture of the linear carbonate and the cyclic carbonate is preferably used as a nonaqueous solvent having low viscosity, a low melting point, and high lithium ion conductivity.

The following compound can be added to the solvent for the purpose of increasing the output: an ester-containing compound such as methyl acetate, ethyl acetate, propyl acetate, methyl propionate, ethyl propionate, or γ-butyrolactone.

The following compound can be added to the solvent for the purpose of enhancing cycle characteristics: a sulfo group-containing compound such as propanesultone or an ether-containing compound such as 1,2-dimethoxyethane, 1,2-diethoxyethane, tetrahydrofuran, 1,3-dioxane, 1,4-dioxane, or 2-methyltetrahydrofuran.

The following compound can be added to the solvent: a nitrile-containing compound such as butyronitrile, valeronitrile, n-heptanenitrile, succinonitrile, glutaronitrile, adiponitrile, pimelonitrile, 1,2,3-propanetricarbonitrile, or 1,3,5-pentanetricarbonitrile.

A solvent in which one of these hydrogen (H) atoms is substituted with a fluorine (F) atom can be used.

For example, a lithium salt can be used as the electrolyte salt. A lithium salt containing one or more elements selected from the group consisting of P, B, F, O, S, N, and Cl can be used as the lithium salt. The following compounds can be used as examples: $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylates, LiCl, LiBr, LiI, chloroborane lithium, borates, and imide salts. In particular, $LiPF_6$ is preferably used from the viewpoint of ionic conductivity and electrochemical stability.

Electrolyte salts may be used alone or in combination. These electrolyte salts are preferably contained at a rate of 0.8 mol to 1.5 mol per L of the nonaqueous electrolyte.

[Separator]

For example, a porous sheet having ion permeability and insulating properties is used for the separator. Examples of the porous sheet include microporous thin films, woven fabrics, and unwoven fabrics.

In particular, a base material making up the separator is preferably, for example, a polyolefin such as polyethylene or polypropylene from the viewpoint of enhancing the safety by a shutdown function.

The separator preferably has a thickness of 0.5 μm to 20 μm and more preferably 1 μm to 18 μm.

The air permeability of the separator is preferably 10 s/100 mL to 500 s/100 mL as expressed in terms of the Gurley value. The Gurley value is more preferably 100 s/100 mL to 300 s/100 mL. Herein, the Gurley value is the time in seconds required for 100 mL of air to pass through a membrane at a pressure of 0.879 g/mm$^2$ as determined by a method according to JIS P 8117. When the Gurley value is too large, the ion permeability is low. However, when the Gurley value is too small, the strength of the separator is low in some cases.

From the viewpoint of reducing the deterioration of the separator due to the heat generated from the positive electrode during discharge under high-temperature conditions, a heat-resistant layer containing a heat-resistant material is preferably placed on a surface of the separator that faces the positive electrode. For example, resins, such as engineering plastics, excellent in heat resistance and inorganic compounds such as ceramics are cited as the heat-resistant layer.

In particular, the following resins are more preferable: for example, polyamide resins such as aliphatic polyamides and aromatic polyamides (aramides), polyimide resins such as polyamideimides and polyimides, and the like. Examples of inorganic particles include metal oxides and metal hydroxides. In particular, alumina, titania, and boehmite are preferable and alumina and boehmite are more preferable. Incidentally, two or more types of inorganic particles may be used.

When a micro-short circuit is caused, a short-circuit current flows to generate heat. The presence of the heat-resistant layer improves the heat resistance and enables the melting of the separator by heat to be reduced, which is advantageous.

EXAMPLES

Examples of the present invention are described below in detail with reference to experiment examples. The present invention is not limited to the examples below. Appropriate modifications can be made without departing from the gist of the present invention.

First Experiment Example

[Preparation of Positive Electrode Plate 1]

The following materials were mixed together: 100 parts by mass of a lithium-nickel-cobalt-aluminium composite oxide, represented by $LiNi_{0.82}Co_{0.15}Al_{0.03}O_2$, serving as a positive electrode active material; 1 part by mass of acetylene black (AB) serving as a conductive agent; and 0.9 parts by mass of polyvinylidene fluoride (PVdF) serving as a binder. Furthermore, an appropriate amount of NMP (N-methyl-2-pyrrolidone) was added, followed by preparing positive electrode mix slurry.

Next, the positive electrode mix slurry was applied to both surfaces of a positive electrode current collector composed of aluminium foil with a thickness of 15 μm and was dried. This was cut to a predetermined electrode size and was rolled using a roller such that the density of a mix was 3.63 g/cc. Thereafter, a positive electrode current-collecting tab was attached to the positive electrode current collector, whereby a positive electrode plate including the positive electrode current collector and positive electrode mix layers formed thereon was prepared.

The positive electrode plate prepared in this way is hereinafter referred to as the positive electrode plate 1.

[Preparation of Negative Electrode Plate 1]

The following materials were mixed together: 100 parts by mass of a graphite powder serving as a negative electrode active material, 1 part by mass of CMC serving as a thickening agent, and 1 part by mass of SBR serving as a binder. Furthermore, an appropriate amount of water was added, followed by preparing negative electrode mix slurry.

Next, the negative electrode mix slurry was applied to both surfaces of a negative electrode current collector composed of copper foil with a thickness of 8 μm and was dried. This was cut to a predetermined electrode size and was rolled using a roller such that the density of a mix was 1.66 g/cc. Thereafter, a negative electrode current-collecting tab was attached to the negative electrode current collector, whereby a negative electrode plate including the negative electrode current collector and negative electrode mix layers formed thereon was prepared.

The negative electrode plate prepared in this way is hereinafter referred to as the negative electrode plate 1.

[Preparation of Positive Electrode Plate 2]

The following materials were mixed together: 100 parts by mass of a lithium-nickel-cobalt-aluminium composite oxide, represented by $LiNi_{0.91}Co_{0.06}Al_{0.03}O_2$, serving as a positive electrode active material; 1 part by mass of AB serving as a conductive agent; and 0.9 parts by mass of PVdF serving as a binder. Furthermore, an appropriate amount of NMP was added, followed by preparing positive electrode mix slurry.

Next, the positive electrode mix slurry was applied to both surfaces of a positive electrode current collector composed of aluminium foil with a thickness of 13 μm and was dried. This was cut to a predetermined electrode size and was rolled using a roller such that the density of a mix was 3.63 g/cc. Thereafter, a positive electrode current-collecting tab was attached to the positive electrode current collector, whereby a positive electrode plate including the positive electrode current collector and positive electrode mix layers formed thereon was prepared.

The positive electrode plate prepared in this way is hereinafter referred to as the positive electrode plate 2.

[Preparation of Negative Electrode Plate 2]

The following materials were mixed together: 93 parts by mass of a graphite powder serving as a negative electrode active material, 7 parts by mass of the silicon compound SiO, 1 part by mass of CMC serving as a thickening agent, and 1 part by mass of SBR serving as a binder. Furthermore, an appropriate amount of water was added, followed by preparing negative electrode mix slurry.

Next, the negative electrode mix slurry was applied to both surfaces of a negative electrode current collector composed of copper foil with a thickness of 6 μm and was dried. This was cut to a predetermined electrode size and was rolled using a roller such that the density of a mix was 1.59 g/cc. Thereafter, a negative electrode current-collecting tab was attached to the negative electrode current collector, whereby a negative electrode plate including the negative electrode current collector and negative electrode mix layers formed thereon was prepared.

The negative electrode plate prepared in this way is hereinafter referred to as the negative electrode plate 2.

[Preparation of Positive Electrode Plate 3]

The following materials were mixed together: 100 parts by mass of a lithium-nickel-cobalt-aluminium composite oxide, represented by $LiNi_{0.88}Co_{0.09}Al_{0.03}O_2$, serving as a positive electrode active material; 0.75 parts by mass of AB serving as a conductive agent; and 0.7 parts by mass of PVdF serving as a binder. Furthermore, an appropriate amount of NMP was added, followed by preparing positive electrode mix slurry.

Next, the positive electrode mix slurry was applied to both surfaces of a positive electrode current collector composed of aluminium foil with a thickness of 15 μm and was dried. This was cut to a predetermined electrode size and was rolled using a roller such that the density of a mix was 3.66 g/cc. Thereafter, a positive electrode current-collecting tab was attached to the positive electrode current collector, whereby a positive electrode plate including the positive electrode current collector and positive electrode mix layers formed thereon was prepared.

The positive electrode plate prepared in this way is hereinafter referred to as the positive electrode plate 3.

[Preparation of Negative Electrode Plate 3]

The following materials were mixed together: 96 parts by mass of a graphite powder serving as a negative electrode active material, 4 parts by mass of the silicon compound SiO, 1 part by mass of CMC serving as a thickening agent, and 1 part by mass of SBR serving as a binder. Furthermore, an appropriate amount of water was added, followed by preparing negative electrode mix slurry.

Next, the negative electrode mix slurry was applied to both surfaces of a negative electrode current collector composed of copper foil with a thickness of 8 μm and was dried. This was cut to a predetermined electrode size and was rolled using a roller such that the density of a mix was 1.65 g/cc. Thereafter, a negative electrode current-collecting tab was attached to the negative electrode current collector, whereby a negative electrode plate including the negative electrode current collector and negative electrode mix layers formed thereon was prepared.

The negative electrode plate prepared in this way is hereinafter referred to as the negative electrode plate 3.

[Preparation of Heat-Resistant Separator 1]

Polyamide serving as resin and an alumina filler were dispersed in an organic solvent and the dispersion was applied to a surface of a separator of a microporous membrane mainly containing polyethylene and was dried, whereby a heat-resistant separator having a resin film, excellent in heat resistance, formed thereon was prepared.

The heat-resistant separator prepared in this way is hereinafter referred to as the heat-resistant separator 1.

[Preparation of Heat-Resistant Separator 1]

Boehmite particles serving as ceramics and a binder were dispersed in a dispersion medium and the dispersion was applied to a surface of a separator of a microporous membrane mainly containing polyethylene and was dried, whereby a heat-resistant separator having a ceramic film formed thereon was prepared.

The heat-resistant separator prepared in this way is hereinafter referred to as the heat-resistant separator 2.

[Preparation of Nonaqueous Electrolyte Solution]

EC, DMC, and MEC were mixed together at a volume ratio of 20:75:5. Furthermore, $LiPF_6$ serving as an electrolyte was dissolved in the solvent mixture such that the concentration of $LiPF_6$ was 1.4 moles per liter, whereby a nonaqueous electrolyte solution was prepared.

[Preparation of Battery]

An enclosure can used was a container, made of metal, having a diameter of 18 mm and a height of 65 mm. An electrode group was inserted into the enclosure can. The enclosure can was connected to a negative electrode current-collecting tab and a sealing member was connected to a positive electrode current-collecting tab. Thereafter, a predetermined amount of the nonaqueous electrolyte solution was poured into the enclosure can and a nonaqueous electrolyte secondary battery was prepared.

Experiment Example 1

The positive electrode plate 1 which was adjusted such that the distance (L) from the winding start of the positive electrode plate to the positive electrode current-collecting tab was 315 mm and the negative electrode plate 1 were placed opposite to each other. The positive electrode plate and the negative electrode plate were spirally wound with the heat-resistant separator 1 with a thickness of 16.8 μm therebetween, whereby an electrode group was prepared. A battery was prepared. Incidentally, the $S_{MD}/S_{TD}$ of the separator was 0.72 and the $E_{MD}/E_{TD}$ thereof was 0.58.

The battery prepared in this way is hereinafter referred to as Battery A1.

Experiment Example 2

The positive electrode plate 1 which was adjusted such that the distance (L) from the winding start of the positive electrode plate to the positive electrode current-collecting tab was 315 mm and the negative electrode plate 1 were placed opposite to each other. The positive electrode plate and the negative electrode plate were spirally wound with the heat-resistant separator 1 with a thickness of 17.5 μm therebetween, whereby an electrode group was prepared. A battery was prepared. Incidentally, the $S_{MD}/S_{TD}$ of the separator was 1.37 and the $E_{MD}/E_{TD}$ thereof was 0.34.

The battery prepared in this way is hereinafter referred to as Battery A2.

Experiment Example 3

The positive electrode plate 1 which was adjusted such that the distance (L) from the winding start of the positive electrode plate to the positive electrode current-collecting tab was 315 mm and the negative electrode plate 1 were placed opposite to each other. The positive electrode plate and the negative electrode plate were spirally wound with the heat-resistant separator 1 with a thickness of 17.3 μm therebetween, whereby an electrode group was prepared. A battery was prepared. Incidentally, the $S_{MD}/S_{TD}$ of the separator was 1.12 and the $E_{MD}/E_{TD}$ thereof was 0.73.

The battery prepared in this way is hereinafter referred to as Battery A3.

Experiment Example 4

The positive electrode plate 1 which was adjusted such that the distance (L) from the winding start of the positive electrode plate to the positive electrode current-collecting tab was 258 mm and the negative electrode plate 1 were placed opposite to each other. The positive electrode plate and the negative electrode plate were spirally wound with the heat-resistant separator 2 with a thickness of 16 μm therebetween, whereby an electrode group was prepared. A battery was prepared. Incidentally, the $S_{MD}/S_{TD}$ of the separator was 1.11 and the $E_{MD}/E_{TD}$ thereof was 0.70. The $E_{MD}$ of the separator was 70%.

The battery prepared in this way is hereinafter referred to as Battery A4.

Experiment Example 5

The positive electrode plate 3 which was adjusted such that the distance (L) from the winding start of the positive electrode plate to the positive electrode current-collecting tab was 300 mm and the negative electrode plate 3 were placed opposite to each other. The positive electrode plate and the negative electrode plate were spirally wound with the heat-resistant separator 2 with a thickness of 14 μm therebetween, whereby an electrode group was prepared. A battery was prepared. Incidentally, the $S_{MD}/S_{TD}$ of the separator was 0.85 and the $E_{MD}/E_{TD}$ thereof was 1.29.

The battery prepared in this way is hereinafter referred to as Battery A5.

Experiment Example 6

The positive electrode plate 2 which was adjusted such that the distance (L) from the winding start of the positive electrode plate to the positive electrode current-collecting tab was 263 mm and the negative electrode plate 2 were placed opposite to each other. The positive electrode plate and the negative electrode plate were spirally wound with the heat-resistant separator 2 with a thickness of 16.9 μm therebetween, whereby an electrode group was prepared. A battery was prepared. Incidentally, the $S_{MD}/S_{TD}$ of the separator was 2.26 and the $E_{MD}/E_{TD}$ thereof was 0.15.

The battery prepared in this way is hereinafter referred to as Battery Z1.

Experiment Example 7

The positive electrode plate 1 which was adjusted such that the distance (L) from the winding start of the positive electrode plate to the positive electrode current-collecting tab was 315 mm and the negative electrode plate 1 were placed opposite to each other. The positive electrode plate and the negative electrode plate were spirally wound with the heat-resistant separator 1 with a thickness of 16.9 μm therebetween, whereby an electrode group was prepared. A battery was prepared. Incidentally, the $S_{MD}/S_{TD}$ of the separator was 0.71 and the $E_{MD}/E_{TD}$ thereof was 1.41.

The battery prepared in this way is hereinafter referred to as Battery Z2.

Experiment Example 8

The positive electrode plate 1 which was adjusted such that the distance (L) from the winding start of the positive electrode plate to the positive electrode current-collecting tab was 315 mm and the negative electrode plate 1 were placed opposite to each other. The positive electrode plate and the negative electrode plate were spirally wound with the heat-resistant separator 1 with a thickness of 17.2 μm therebetween, whereby an electrode group was prepared. A battery was prepared. Incidentally, the $S_{MD}/S_{TD}$ of the separator was 1.41 and the $E_{MD}/E_{TD}$ thereof was 0.45.

The battery prepared in this way is hereinafter referred to as Battery Z3.

Experiment Example 9

The positive electrode plate 1 which was adjusted such that the distance (L) from the winding start of the positive electrode plate to the positive electrode current-collecting tab was 315 mm and the negative electrode plate 1 were placed opposite to each other. The positive electrode plate and the negative electrode plate were spirally wound with the heat-resistant separator 1 with a thickness of 17.8 μm therebetween, whereby an electrode group was prepared. A battery was prepared. Incidentally, the $S_{MD}/S_{TD}$ of the separator was 0.74 and the $E_{MD}/E_{TD}$ thereof was 1.52.

The battery prepared in this way is hereinafter referred to as Battery Z4.

(Impact Test)

Batteries A1 to A5 and Z1 to Z4 were charged at 25° C. with a current of 975 mA in a constant current mode until the voltage of each battery reached 4.2 V and were then charged with a voltage of 4.2 V in a constant voltage mode until the current reached 65 mA. Thereafter, these batteries were tested in accordance with items (a 15.8 mm diameter round bar made of metal is placed on the center of a battery and a 9.1 kg weight is dropped from a height of 61 cm) of a T6 impact test under UN transportation test conditions. A test result of a battery that did not rupture or ignite within 6 hours after testing is rated "A" and a test result of a battery other than it is rated "B" as shown in Table 1.

TABLE 1

| | Positive electrode | | Separator | | |
|---|---|---|---|---|---|
| Battery | Active material | Tab position L (mm) | Tensile strength ratio $S_{MD}/S_{TD}$ | Tensile elongation ratio $E_{MD}/E_{TD}$ | Test result |
| A1 | $LiNi_{0.82}Co_{0.15}Al_{0.03}O_2$ | 315 | 0.72 | 0.58 | A |
| A2 | $LiNi_{0.82}Co_{0.15}Al_{0.03}O_2$ | 315 | 1.37 | 0.34 | A |
| A3 | $LiNi_{0.82}Co_{0.15}Al_{0.03}O_2$ | 315 | 1.12 | 0.73 | A |
| A4 | $LiNi_{0.82}Co_{0.15}Al_{0.03}O_2$ | 258 | 1.11 | 0.70 | A |
| A5 | $LiNi_{0.88}Co_{0.09}Al_{0.03}O_2$ | 300 | 0.85 | 1.29 | A |
| Z1 | $LiNi_{0.91}Co_{0.06}Al_{0.03}O_2$ | 263 | 2.26 | 0.15 | B |
| Z2 | $LiNi_{0.82}Co_{0.15}Al_{0.03}O_2$ | 315 | 0.71 | 1.41 | B |
| Z3 | $LiNi_{0.82}Co_{0.15}Al_{0.03}O_2$ | 315 | 1.41 | 0.45 | B |
| Z4 | $LiNi_{0.82}Co_{0.15}Al_{0.03}O_2$ | 315 | 0.74 | 1.52 | B |

As is clear from Table 1, Batteries A1 to A5, in which the separators have an MD direction tensile strength ($S_{MD}$)-to-TD direction tensile strength ($S_{TD}$) ratio ($S_{MD}/S_{TD}$) of from 0.72 to 1.37 and an MD direction tensile elongation ($E_{MD}$)-to-TD direction tensile elongation ($E_{TD}$) ratio ($E_{MD}/E_{TD}$) of from 0.34 to 1.29, did not rupture or ignite.

On the other hand, Batteries Z1 to Z4 ruptured or ignited. This suggests that in the case where at least one of the MD direction tensile strength ($S_{MD}$)-to-TD direction tensile strength ($S_{TD}$) ratio ($S_{MD}/S_{TD}$) and MD direction tensile elongation ($E_{MD}$)-to-TD direction tensile elongation ($E_{TD}$) ratio ($E_{MD}/E_{TD}$) of a separator deviates from a predetermined value (is anisotropic), when an impact is applied to a battery from the outside, the separator is split and a short circuit is caused.

Second Experiment Example

[Preparation of Mimic Test Battery]
An enclosure can used was a container, made of metal, having a diameter of 18 mm and a height of 65 mm. An electrode group was inserted into the enclosure can and the enclosure can was connected to a negative electrode current-collecting tab, whereby a mimic test battery was prepared. Incidentally, a separator used was a 16 μm thick microporous membrane mainly containing polyethylene. The $S_{MD}/S_{TD}$ of the separator was 1.32 and the $E_{MD}/E_{TD}$ thereof was 0.65.

Experiment Example 10

The positive electrode plate 3 which was adjusted such that the distance (L) from the winding start of the positive electrode plate to the positive electrode current-collecting tab was 150 mm and the negative electrode plate 3 were placed opposite to each other. The positive electrode plate and the negative electrode plate were spirally wound with a microporous membrane separator mainly containing polyethylene therebetween, whereby an electrode group was prepared. A mimic test battery was prepared.

The mimic test battery prepared in this way is hereinafter referred to as Battery Z5.

Experiment Example 11

The positive electrode plate 3 which was adjusted such that the distance (L) from the winding start of the positive electrode plate to the positive electrode current-collecting tab was 175 mm and the negative electrode plate 3 were placed opposite to each other. The positive electrode plate and the negative electrode plate were spirally wound with a microporous membrane separator mainly containing polyethylene therebetween, whereby an electrode group was prepared. A mimic test battery was prepared.

The mimic test battery prepared in this way is hereinafter referred to as Battery Z6.

Experiment Example 12

The positive electrode plate 3 which was adjusted such that the distance (L) from the winding start of the positive electrode plate to the positive electrode current-collecting tab was 200 mm and the negative electrode plate 3 were placed opposite to each other. The positive electrode plate and the negative electrode plate were spirally wound with a microporous membrane separator mainly containing polyethylene therebetween, whereby an electrode group was prepared. A mimic test battery was prepared.

The mimic test battery prepared in this way is hereinafter referred to as Battery A6.

Experiment Example 13

The positive electrode plate 3 which was adjusted such that the distance (L) from the winding start of the positive electrode plate to the positive electrode current-collecting tab was 250 mm and the negative electrode plate 3 were placed opposite to each other. The positive electrode plate and the negative electrode plate were spirally wound with a microporous membrane separator mainly containing polyethylene therebetween, whereby an electrode group was prepared. A mimic test battery was prepared.

The mimic test battery prepared in this way is hereinafter referred to as Battery A7.

Experiment Example 14

The positive electrode plate 3 which was adjusted such that the distance (L) from the winding start of the positive electrode plate to the positive electrode current-collecting tab was 300 mm and the negative electrode plate 3 were placed opposite to each other. The positive electrode plate and the negative electrode plate were spirally wound with a microporous membrane separator mainly containing polyethylene therebetween, whereby an electrode group was prepared. A mimic test battery was prepared.

The mimic test battery prepared in this way is hereinafter referred to as Battery A8.

Experiment Example 15

The positive electrode plate 3 which was adjusted such that the distance (L) from the winding start of the positive electrode plate to the positive electrode current-collecting tab was 450 mm and the negative electrode plate 3 were placed opposite to each other. The positive electrode plate and the negative electrode plate were spirally wound with a microporous membrane separator mainly containing polyethylene therebetween, whereby an electrode group was prepared. A mimic test battery was prepared.

The mimic test battery prepared in this way is hereinafter referred to as Battery A9.

(Impact Mimic Test)
For Batteries A6 to A9, Z7, and Z8, a 15.8 mm diameter round bar made of metal was placed on the center of each battery and a 9.1 kg weight was dropped from a height of 61 cm. Judgments were made by confirming measurement results of the resistance of the tested mimic test batteries and the condition of the separator obtained by disassembling each mimic test battery. A test result of a battery which has a split in a separator and which is therefore short-circuited is rated "B" and a test result of a battery other than it is rated "A" as shown in Table 2.

TABLE 2

| Battery | Positive electrode Active material | Tab position L (mm) | Separator Tensile strength ratio ($S_{MD}/S_{TD}$) | Tensile elongation ratio ($E_{MD}/E_{TD}$) | Test result |
|---|---|---|---|---|---|
| Z5 | $LiNi_{0.88}Co_{0.09}Al_{0.03}O_2$ | 150 | 1.32 | 0.65 | B |
| Z6 | $LiNi_{0.88}Co_{0.09}Al_{0.03}O_2$ | 175 | 1.32 | 0.65 | B |
| A6 | $LiNi_{0.88}Co_{0.09}Al_{0.03}O_2$ | 200 | 1.32 | 0.65 | A |
| A7 | $LiNi_{0.88}Co_{0.09}Al_{0.03}O_2$ | 250 | 1.32 | 0.65 | A |
| A8 | $LiNi_{0.88}Co_{0.09}Al_{0.03}O_2$ | 300 | 1.32 | 0.65 | A |
| A9 | $LiNi_{0.88}Co_{0.09}Al_{0.03}O_2$ | 450 | 1.32 | 0.65 | A |

As is clear from Table 2, Batteries A6 to A9, in which the distance (L) from the winding start of the positive electrode plate to the positive electrode current-collecting tab is 200 mm or more, were not short-circuited or had no split in the separators after testing.

On the other hand, Batteries Z5 and Z6 were short-circuited and had splits in the separators after testing. This suggests that placing a positive electrode current-collecting tab at such a position that the distance (L) from the winding start of a positive electrode plate to the positive electrode current-collecting tab is 200 mm or more reduces the curvature of the positive electrode current-collecting tab and therefore a separator is unlikely to be split when an impact is applied to a battery from the outside.

Third Experiment Example

[Preparation of Positive Electrode Plate 4]

The following materials were mixed together: 96.5 parts by mass of lithium cobaltate, represented by $LiCoO_2$, serving as a positive electrode active material; 1.5 parts by mass of AB serving as a conductive agent; and 2 parts by mass of PVdF serving as a binder. Furthermore, an appropriate amount of NMP was added, followed by preparing positive electrode mix slurry.

Next, the positive electrode mix slurry was applied to both surfaces of a positive electrode current collector composed of aluminium foil with a thickness of 13 μm and was dried. This was cut to a predetermined electrode size and was rolled using a roller such that the density of a mix was 3.74 g/cc. Thereafter, a positive electrode current-collecting tab was attached to the positive electrode current collector, whereby a positive electrode plate including the positive electrode current collector and positive electrode mix layers formed thereon was prepared.

The positive electrode plate prepared in this way is hereinafter referred to as the positive electrode plate 4.

[Preparation of Battery]

Experiment Example 16

The positive electrode plate 4 which was adjusted such that the distance (L) from the winding start of the positive electrode plate to the positive electrode current-collecting tab was 150 mm and the negative electrode plate 3 were placed opposite to each other. The positive electrode plate and the negative electrode plate were spirally wound with a microporous membrane separator mainly containing polyethylene therebetween, whereby an electrode group was prepared. A mimic test battery was prepared.

The mimic test battery prepared in this way is hereinafter referred to as Battery Z7.

Experiment Example 17

The positive electrode plate 4 which was adjusted such that the distance (L) from the winding start of the positive electrode plate to the positive electrode current-collecting tab was 175 mm and the negative electrode plate 3 were placed opposite to each other. The positive electrode plate and the negative electrode plate were spirally wound with a microporous membrane separator mainly containing polyethylene therebetween, whereby an electrode group was prepared. A mimic test battery was prepared.

The mimic test battery prepared in this way is hereinafter referred to as Battery Z8.

Experiment Example 18

The positive electrode plate 4 which was adjusted such that the distance (L) from the winding start of the positive electrode plate to the positive electrode current-collecting tab was 300 mm and the negative electrode plate 3 were placed opposite to each other. The positive electrode plate and the negative electrode plate were spirally wound with a microporous membrane separator mainly containing polyethylene therebetween, whereby an electrode group was prepared. A mimic test battery was prepared.

The mimic test battery prepared in this way is hereinafter referred to as Battery Z9.

(Impact Mimic Test)

For Batteries A8 and Z7 to Z9, a 15.8 mm diameter round bar made of metal was placed on the center of each battery and a 9.1 kg weight was dropped from a height of 61 cm. Judgments were made by confirming measurement results of the resistance of the tested batteries and the condition of the separator obtained by disassembling each battery. A result of a battery which is short-circuited and which has a split in a separator is rated "B" and a result of a battery other than it is rated "A" as shown in Table 3.

TABLE 3

| Battery | Positive electrode Active material | Tab position L (mm) | Separator Tensile strength ratio ($S_{MD}/S_{TD}$) | Tensile elongation ratio ($E_{MD}/E_{TD}$) | Test result |
|---|---|---|---|---|---|
| A8 | $LiNi_{0.88}Co_{0.09}Al_{0.03}O_2$ | 300 | 1.32 | 0.65 | A |
| Z7 | $LiCoO_2$ | 150 | 1.32 | 0.65 | B |
| Z8 | $LiCoO_2$ | 175 | 1.32 | 0.65 | B |
| Z9 | $LiCoO_2$ | 300 | 1.32 | 0.65 | B |

As is clear from Table 3, Battery A8, in which a lithium transition metal oxide represented by the formula $Li_aNi_xM_{1-x}O_2$ ($0.9 \leq a \leq 1.2$, $0.8 \leq x < 1$, and M is at least one element selected from the group consisting of Co, Mn, and Al) was used for a positive electrode active material, was not short-circuited or had no split in the separator after testing.

On the other hand, Batteries Z7 to Z9, in which lithium cobaltate was used for a positive electrode active material, were short-circuited and had splits in the separators after testing.

This is probably because, since particles of a positive electrode active material used in Battery A8 are harder than lithium cobaltate, the positive electrode plate is hard, the electrode group is unlikely to be crushed, the positive electrode current-collecting tab is unlikely to be deformed, and the separator is unlikely to be split.

From the results of the above first to third experiment examples, it has become clear that when a battery has specific separator properties, a positive electrode current-collecting tab position, and the positive electrode active material, rupture and ignition can be prevented even if an impact is applied to the battery from the outside.

Fourth Experiment Example

[Preparation of Battery]

Experiment Example 19

The positive electrode plate 3 which was adjusted such that the distance (L) from the winding start of the positive electrode plate to the positive electrode current-collecting tab was 300 mm and the negative electrode plate 3 were placed opposite to each other. The positive electrode plate and the negative electrode plate were spirally wound with the heat-resistant separator 2 with a thickness of 14 μm therebetween, whereby an electrode group was prepared. A battery was prepared. Incidentally, the $S_{MD}/S_{TD}$ of the separator was 1.05 and the $E_{MD}/E_{TD}$ thereof was 0.91. The $E_{MD}$ of the separator was 100%.

The battery prepared in this way is hereinafter referred to as Battery A10.

(Impact Test)

Batteries A4 and A10 were charged at 25° C. with a current of 975 mA in a constant current mode until the voltage of each battery reached 4.2 V and were then charged with a voltage of 4.2 V in a constant voltage mode until the current reached 65 mA. Thereafter, these batteries were tested in accordance with items (a 15.8 mm diameter round bar made of metal is placed on the center of a battery and a 9.1 kg weight is dropped from a height of 61 cm) of a T6 impact test under UN transportation test conditions. The cell attained temperatures of batteries that did not rupture or ignite within 6 hours after testing are shown in Table 4.

TABLE 4

| Battery | Separator | | | Cell attained temperature (° C.) |
|---|---|---|---|---|
| | Tensile strength ratio ($S_{MD}/S_{TD}$) | Tensile elongation ratio ($E_{MD}/E_{TD}$) | MD direction tensile elongation ($E_{MD}$(%)) | |
| A4 | 1.11 | 0.70 | 70 | 31 |
| A10 | 1.05 | 0.91 | 100 | 24 |

As is clear from Table 4, Battery A10, in which the MD direction tensile elongation ($E_{MD}$) of the separator is 100%, is 7° C. lower in post-test cell attained temperature than Battery A4, in which the MD direction tensile elongation ($E_{MD}$) of the separator is 70%. Therefore, it is conceivable that the split of the separator of Battery A10 is more suppressed than that of Battery A4. It is conceivable that the MD direction tensile elongation ($E_{MD}$) of a separator is preferably 100% or more.

Fifth Experiment Example

Experiment Example 20

The positive electrode plate 1 which was adjusted such that the distance (L) from the winding start of the positive electrode plate to the positive electrode current-collecting tab was 315 mm and the negative electrode plate 1 were placed opposite to each other. The positive electrode plate and the negative electrode plate were spirally wound with a separator therebetween, the separator being composed of a 16 μm thick microporous membrane mainly containing polyethylene, whereby an electrode group was prepared. A battery was prepared. Incidentally, the $S_{MD}/S_{TD}$ of the separator was 1.25 and the $E_{MD}/E_{TD}$ thereof was 0.68.

The battery prepared in this way is hereinafter referred to as Battery A11.

Experiment Example 21

The positive electrode plate 1 which was adjusted such that the distance (L) from the winding start of the positive electrode plate to the positive electrode current-collecting tab was 315 mm and the negative electrode plate 1 were placed opposite to each other. The positive electrode plate and the negative electrode plate were spirally wound with the heat-resistant separator 1 with a thickness of 17.2 μm therebetween, whereby an electrode group was prepared. A battery was prepared. Incidentally, the $S_{MD}/S_{TD}$ of the separator was 0.85 and the $E_{MD}/E_{TD}$ thereof was 0.89.

The battery prepared in this way is hereinafter referred to as Battery A12.

(Impact Test)

Batteries A11 and A12 were charged at 25° C. with a current of 975 mA in a constant current mode until the voltage of each battery reached 4.2 V and were then charged with a voltage of 4.2 V in a constant voltage mode until the current reached 65 mA. Thereafter, these batteries were tested in accordance with items (a 15.8 mm diameter round bar made of metal is placed on the center of a battery and a 9.1 kg weight is dropped from a height of 61 cm) of a T6 impact test under UN transportation test conditions. The cell attained temperatures of batteries that did not rupture or ignite within 6 hours after testing are shown in Table 5.

TABLE 5

| Battery | Separator | | | Cell attained temperature (° C.) |
|---|---|---|---|---|
| | Tensile strength ratio ($S_{MD}/S_{TD}$) | Tensile elongation ratio ($E_{MD}/E_{TD}$) | Heat-resistant layer | |
| A11 | 1.25 | 0.68 | Absent | 27 |
| A12 | 0.85 | 0.89 | Present | 25 |

As is clear from Table 5, Battery A12, in which the separator includes a heat-resistant layer, is 2° C. lower in post-test cell attained temperature than Battery A11, in which the separator includes no heat-resistant layer. Therefore, it is conceivable that Battery A12 is improved in heat resistance because Battery A12 includes the heat-resistant layer and the presence of the heat-resistant layer reduces the melting of the separator by the heat generated by the fact that a short-circuit current flows when a micro-short circuit is caused. Hence, a separator preferably includes a heat-resistant layer.

Sixth Experiment Example

[Preparation of Positive Electrode Plate 5]

The following materials were mixed together: 100 parts by mass of a lithium-nickel-cobalt-aluminium composite oxide, represented by $LiNi_{0.91}Co_{0.06}Al_{0.03}O_2$, serving as a positive electrode active material; 1.3 parts by mass of AB serving as a conductive agent; and 1 part by mass of PVdF serving as a binder. Furthermore, an appropriate amount of NMP was added, followed by preparing positive electrode mix slurry.

Next, the positive electrode mix slurry was applied to both surfaces of a positive electrode current collector composed of aluminium foil with a thickness of 14 μm and was dried. This was cut to a predetermined electrode size and was rolled using a roller such that the density of a mix was 3.59 g/cc. Thereafter, a positive electrode current-collecting tab was attached to the positive electrode current collector, whereby a positive electrode plate including the positive electrode current collector and positive electrode mix layers formed thereon was prepared.

The positive electrode plate prepared in this way is hereinafter referred to as the positive electrode plate 5.

[Preparation of Negative Electrode Plate 4]

The following materials were mixed together: 93 parts by mass of a graphite powder serving as a negative electrode active material, 7 parts by mass of the silicon compound SiO, 1 part by mass of CMC serving as a thickening agent, and 1 part by mass of SBR serving as a binder. Furthermore, an appropriate amount of water was added, followed by preparing negative electrode mix slurry.

Next, the negative electrode mix slurry was applied to both surfaces of a negative electrode current collector composed of copper foil with a thickness of 8 μm and was dried. This was cut to a predetermined electrode size and was rolled using a roller such that the density of a mix was 1.60 g/cc. Thereafter, a negative electrode current-collecting tab was attached to the negative electrode current collector, whereby a negative electrode plate including the negative electrode current collector and negative electrode mix layers formed thereon was prepared.

The negative electrode plate prepared in this way is hereinafter referred to as the negative electrode plate 4.

Experiment Example 22

The positive electrode plate 1 which was adjusted such that the distance (L) from the winding start of the positive electrode plate to the positive electrode current-collecting tab was 315 mm and the negative electrode plate 1 were placed opposite to each other. The positive electrode plate and the negative electrode plate were spirally wound with the heat-resistant separator 1 with a thickness of 16.7 μm therebetween, whereby an electrode group was prepared. A battery was prepared. Incidentally, the $S_{MD}/S_{TD}$ of the separator was 1.10 and the $E_{MD}/E_{TD}$ thereof was 0.59.

The battery prepared in this way is hereinafter referred to as Battery A13.

Experiment Example 23

The positive electrode plate 5 which was adjusted such that the distance (L) from the winding start of the positive electrode plate to the positive electrode current-collecting tab was 279 mm and the negative electrode plate 4 were placed opposite to each other. The positive electrode plate and the negative electrode plate were spirally wound with the heat-resistant separator 1 with a thickness of 16.7 μm therebetween, whereby an electrode group was prepared. A battery was prepared. Incidentally, the $S_{MD}/S_{TD}$ of the separator was 1.10 and the $E_{MD}/E_{TD}$ thereof was 0.59.

The battery prepared in this way is hereinafter referred to as Battery A14.

(Impact Test)

Batteries A13 and A14 were charged at 25° C. with a current of 975 mA in a constant current mode until the voltage of each battery reached 4.2 V and were then charged with a voltage of 4.2 V in a constant voltage mode until the current reached 65 mA. Thereafter, these batteries were tested in accordance with items (a 15.8 mm diameter round bar made of metal is placed on the center of a battery and a 9.1 kg weight is dropped from a height of 61 cm) of a T6 impact test under UN transportation test conditions. The cell attained temperatures of batteries that did not rupture or ignite within 6 hours after testing are shown in Table 6.

TABLE 6

| Battery | Positive electrode | | Negative electrode | | Cell attained temperature (° C.) |
|---|---|---|---|---|---|
| | Active material | Tab position L (mm) | Graphite | Silicon compound | |
| A13 | $LiNi_{0.82}Co_{0.15}Al_{0.03}O_2$ | 315 | 100 | — | 29 |
| A14 | $LiNi_{0.91}Co_{0.06}Al_{0.03}O_2$ | 279 | 93 | 7 | 23 |

As is clear from Table 6, Battery A14, in which the negative electrode active material contains the silicon compound, is 6° C. lower in post-test cell attained temperature than Battery A13, in which the negative electrode active material contains no silicon compound.

This is probably because Battery A14 contains the silicon compound, of which power has high resistance, and therefore the resistance of the negative electrode plate is higher than that of Battery A13. Therefore, a negative electrode plate preferably contains the silicon compound because it is conceivable that, in the case where a micro-short circuit is caused, as the resistance of an electrode plate is higher, the current flowing during short circuiting can be more reduced and Battery A14 is more reduced in short-circuit current as compared to Battery A13.

REFERENCE SIGNS LIST

9 Enclosure can
16 Positive electrode plate
17 Negative electrode plate
18 Separator
19 Positive electrode current-collecting tab
20 Negative electrode current-collecting tab
L The distance from the winding start of a positive electrode plate to a positive electrode current-collecting tab
A Winding start
B Winding end

The invention claimed is:

1. A nonaqueous electrolyte secondary battery comprising an electrode group in which a positive electrode plate containing a positive electrode active material and a negative electrode plate containing a negative electrode active material are wound with a separator therebetween, wherein the positive electrode active material uses a lithium transition metal oxide represented by the formula $Li_aNi_xM_{1-x}O_2$ ($0.9 \leq a \leq 1.2$, $0.8 \leq x < 1$, and M is at least one element selected from the group consisting of Co, Mn, and Al), the positive electrode plate is provided with a current-collecting tab placed in a position that is 200 mm to 450 mm apart from the winding start of the positive electrode plate, and the separator has an MD direction tensile strength ($S_{MD}$)-to-TD direction tensile strength ($S_{TD}$) ratio ($S_{MD}/S_{TD}$) of from 0.72 to 1.37 and an MD direction tensile elongation ($E_{MD}$)-to-TD direction tensile elongation ($E_{TD}$) ratio ($E_{MD}/E_{TD}$) of from 0.34 to 1.29.

2. The nonaqueous electrolyte secondary battery according to claim 1, wherein the MD direction tensile elongation ($E_{MD}$) of the separator is 100% or more.

3. The nonaqueous electrolyte secondary battery according claim 1, wherein the separator includes a heat-resistant layer.

4. The nonaqueous electrolyte secondary battery according to claim 1, wherein the negative electrode active material contains $SiO_x$ ($0.5 \leq x \leq 1.5$).

* * * * *